(12) United States Patent
Kondo et al.

(10) Patent No.: US 7,883,160 B2
(45) Date of Patent: Feb. 8, 2011

(54) ELASTIC CRAWLER AND ELASTIC CRAWLER MANUFACTURING METHOD

(75) Inventors: Satoru Kondo, Kobe (JP); Yoshio Ueno, Kobe (JP)

(73) Assignee: Sumitomo Rubber Industries, Ltd., Kobe (JP)

(*) Notice: Subject to any disclaimer, the term of this patent is extended or adjusted under 35 U.S.C. 154(b) by 154 days.

(21) Appl. No.: 12/076,815

(22) Filed: Mar. 24, 2008

(65) Prior Publication Data

US 2008/0272648 A1 Nov. 6, 2008

(30) Foreign Application Priority Data

May 1, 2007 (JP) ............................ P2007-121159

(51) Int. Cl.
*B62D 55/253* (2006.01)
(52) U.S. Cl. ...................................... 305/170; 305/171
(58) Field of Classification Search ................. 305/158, 305/165, 166, 167, 170, 171, 177, 182, 183
See application file for complete search history.

(56) References Cited

U.S. PATENT DOCUMENTS

| 5,593,218 | A  | * | 1/1997 | Katoh et al. | 305/174 |
| 6,203,125 | B1 | * | 3/2001 | Arakawa et al. | 305/166 |
| 6,843,539 | B2 | * | 1/2005 | Tsuru | 305/170 |

FOREIGN PATENT DOCUMENTS

| JP | 54003737 A | * | 1/1979 |
| JP | 10157664 A | * | 6/1998 |
| JP | 2000-159162 |   | 6/2000 |
| JP | 2000168644 A | * | 6/2000 |
| JP | 2001-55182 A |   | 2/2001 |
| JP | 2006-290301 A |   | 10/2006 |
| JP | 2006-315432 A |   | 11/2006 |
| JP | 2006315432 A | * | 11/2006 |
| JP | 2007137338 A | * | 6/2007 |

* cited by examiner

*Primary Examiner*—Russell D Stormer
(74) *Attorney, Agent, or Firm*—Birch, Stewart, Kolasch & Birch, LLP

(57) ABSTRACT

A highly durable elastic crawler with a tensile cord having both ends thereof overlapped mutually in a crawler body thus being circumferentially wound around the crawler is provided. An elastic crawler includes; a crawler body including an endless belt-like elastic body; metal cores embedded in the crawler body, each of the metal cores including vanes and arranged at predetermined intervals circumferentially; and tensile cords transversely arranged, wound around the outer circumference side of the vanes, and embedded in the crawler body while vicinity portions of both ends of the tensile cords are overlapped mutually. An inner circumference side end is arranged at an outer circumference side of any one of the vanes. The distance between the vicinity portion of the inner circumference side end and the outer circumference side portion of the tensile cord overlapped there is increased from the vicinity portion toward the inner circumference side end.

15 Claims, 13 Drawing Sheets

ELASTIC CRAWLER AND ELASTIC CRAWLER MANUFACTURING METHOD

BACKGROUND OF THE INVENTION

1. Field of the Invention

The present invention relates to an elastic crawler in a crawler traveling device used on a civil engineering machine, a construction machine, an agricultural machine, and the like.

2. Description of the Related Art

There is known, as a traveling device such as a civil engineering machine, a crawler traveling device traveling by providing a pair of drive sprockets (drive wheels) on respective sides in one of the forward and backward directions, providing a pair of idlers (rolling wheels) on respective sides in the other direction, and causing an endless belt-like elastic crawler wound around a plurality of rollers to circulate circumferentially.

The elastic crawler is composed of: an endless belt-like crawler body made of an elastic material such as rubber; and transversely extensive metal cores partly embedded in the body and circumferentially arranged at uniform intervals. In view of a high tension acting on the elastic crawler in the circumferential direction, a tensile body circumferentially surrounding the ground side of the metal cores is embedded in the elastic crawler.

The tensile body is configured, for example, so that both ends of each of tensile cords such as steel cords are overlapped (lap-jointed) with each other in the crawler body, the tensile cords are wound by one turn in the circumferential direction of the elastic crawler and arranged in the transverse direction of the crawler.

In such a tensile body, the inner-side end of the tensile cord, when traveling on the drive sprockets and the idlers, is less deformable than the other parts of the tensile cord. This causes a greater strain in the elastic body between the inner-side end of the tensile cord and a part of the tensile cord outside the inner-side end. Repeated strain develops fatigue on the strained part of the elastic body to cause damage such as cracking to the strained part, resulting in facilitated removal of the elastic body off the tensile body.

To address this problem, Japanese Unexamined Patent Publication JP-A 2006-315432 discloses a technique to eliminate cracking on the elastic body. Here, a portion of the tensile cord immediately beside the outer-side cord of the overlapping portion where the overlapping portion turns into a single cord is bent inwardly to render the outer-side cord of the overlapping portion an inwardly inclined portion, so that the inner-side end of the tensile cord is in immediate vicinity of the inwardly inclined portion. JP-A 2006-315432 also discloses a technique to improve durability of the elastic crawler by providing bent portions inclined in the same direction on the overlapping portion in the vicinity of both ends of the tensile cord.

The technique of inwardly bending a portion of the tensile cord immediately beside the outer-side cord of the overlapping portion where the overlapping portion turns into a single cord, as disclosed in the JP-A 2006-315432, has the following disadvantage. A great distortion is applied to the elastic body in the vicinity of the bent portions when the ends of the tensile cord travel on the drive sprockets and the idlers of the traveling device, thus failing to provide sufficient prevention of cracks on the elastic body.

The technique of providing the bent portions inclined in the same direction on the overlapping portions in the vicinity of both ends of the tensile cord, as disclosed in the JP-A 2006-315432, has the following disadvantage. Since the inner-side end of the tensile cord overlaps with the outer-side tensile cord in parallel as observed in the conventional art, the strain applied to the elastic body between the inner-side end of the tensile cord and the outer-side tensile cord in the vicinity of the inner-side end cannot be reduced.

SUMMARY OF THE INVENTION

The present invention has been made in view of the conventional disadvantages. It is an object of the present invention to provide a highly durable elastic crawler having a tensile body with a tensile cord having both ends thereof overlapped with one another in the crawler body thus being circumferentially wound around the crawler.

An elastic crawler according to one aspect of the present invention includes: a crawler body including an elastic body in the form of an endless belt; a plurality of metal cores embedded in the crawler body, each of the metal cores including vanes extending toward lateral ends of the crawler body and arranged at predetermined intervals in a circumferential direction of the crawler body; and a plurality of tensile cords arranged in a transverse direction of the crawler body, wound around the circumference side of the vanes, and embedded in the crawler body while vicinity portions of both ends of each of the tensile cords are overlapped with one another. An inner circumference side end of each of the tensile cords is arranged at a circumference side of any one of the vanes. A distance between a vicinity portion of the inner circumference side end of each of the tensile cords and an outer circumference side portion of the tensile cord overlapped with an inner circumference side portion of the tensile cord is increased from the vicinity portion toward the inner circumference side end or is larger than a distance between the rest of the overlapping portions of the tensile cord.

Each of the tensile cords includes, for example: a first step provided in the vicinity of the inner circumference side end of the tensile cord so that the inner circumference side end is arranged further on an inner circumference side than an opposite side; and a second step provided in vicinity of a starting point so that a portion of overlapping of the outer circumference side portion of the tensile cord ranging from the starting point of overlapping or from a portion in immediate vicinity of the starting point to an outer circumference side end of the tensile cord is arranged further on an outer circumference side than a portion beside the starting point.

An elastic crawler according to another aspect of the present invention includes: a crawler body including an elastic body in the form of an endless belt; a plurality of lugs arranged at predetermined intervals in a circumferential direction of the crawler body and protruding outwardly from an outer surface of the crawler body; and a plurality of tensile cords arranged in a transverse direction of the crawler body and embedded in the crawler body while vicinity portions of both ends of each of the tensile cords are overlapped with one another. An inner circumference side end of each of the tensile cords is arranged at the inner circumference side of one of the lugs. A vicinity portion of the inner circumference side end of each of the tensile cords is bent so that a distance between the vicinity portion and an outer circumference side portion of the tensile cord overlapped with an inner circumference side portion of the tensile cord is increased from the vicinity portion toward the inner circumference side end.

An elastic crawler according to another aspect of the present invention includes: a crawler body including an elastic body in the form of an endless belt; a plurality of metal cores embedded in the crawler body, each of the metal cores including vanes extending toward lateral ends of the crawler body and arranged at predetermined intervals in a circumferential direction of the crawler body; and a plurality of tensile cords arranged in a transverse direction of the crawler body, wound around the circumference side of the vanes, and embedded in the crawler body while vicinity portions of both ends of each of the tensile cords are overlapped with one another. An inner circumference side end of each of the tensile cords is arranged at a circumference side of any one of the vanes. A distance between a vicinity portion of the inner circumference side end of each of the tensile cords and an outer circumference side portion of the tensile cord overlapped with an inner circumference side portion of the tensile cord is increased from the vicinity portion toward the inner circumference side end or is larger than a distance between the rest of the overlapping portions of the tensile cord. A distance between the inner circumference side end of each of the tensile cords and the inner circumference side end of the one of the vanes is larger than a distance between the inner circumference side portion of the tensile cord and the other vanes at the rest of the overlapping portions of the tensile cord.

The elastic crawler includes a plurality of lugs arranged in the circumferential direction of the crawler body and protruding outwardly at predetermined intervals from an outer surface of the crawler body. The inner circumference side end of each of the tensile cords is arranged at the inner circumference side of one of the lugs.

Preferably, at least one group of the plurality of tensile cords is arranged at substantially uniform intervals in the transverse direction of the crawler body, and all the inner circumference side ends of the group of the tensile cords are arranged at the inner circumference side of the one of the lugs.

A method of manufacturing an elastic crawler according to another aspect of the present invention includes the steps of: wrapping the inner circumference side end of each of the tensile cords along a crease of an unvulcanized sheet rubber folded into a U shape; and after the wrapping step, overlapping the outer circumference side portion of each of the tensile cords over the inner circumference side portion thereof and vulcanizing the unvulcanized sheet rubber.

As used herein, the "vicinity portion of the end" of each of the tensile cords refers to an extremely short portion measured from the end relative to the entire length of the tensile cord. According to the present invention, the portion is within the range of, as measured from the end, the distance between (centers of) the metal cores in the circumferential direction (moving direction of the elastic crawler mounted on the crawler traveling device), the circumferential distance between (centers of) the lugs, or larger one of the foregoing circumferential distances.

Thus, the present invention provides a highly durable elastic crawler having a tensile body with a tensile cord having both ends thereof overlapped with one another in the crawler body thus being circumferentially wound around the crawler.

DETAILED DESCRIPTION

Figure 1:
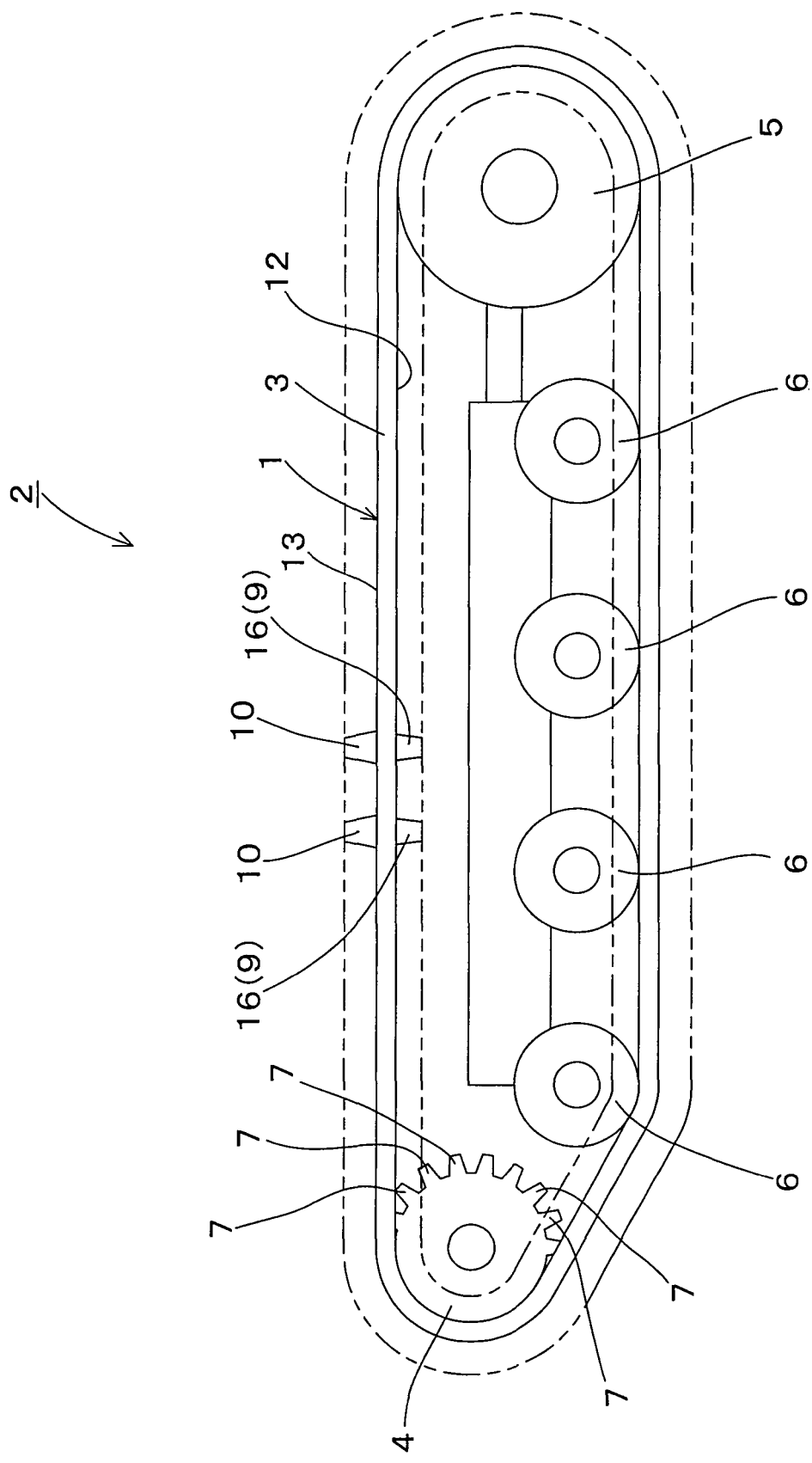
FIG. 1 is a side view of a crawler traveling device to which an elastic crawler according to the present invention is attached.
Figure 2:
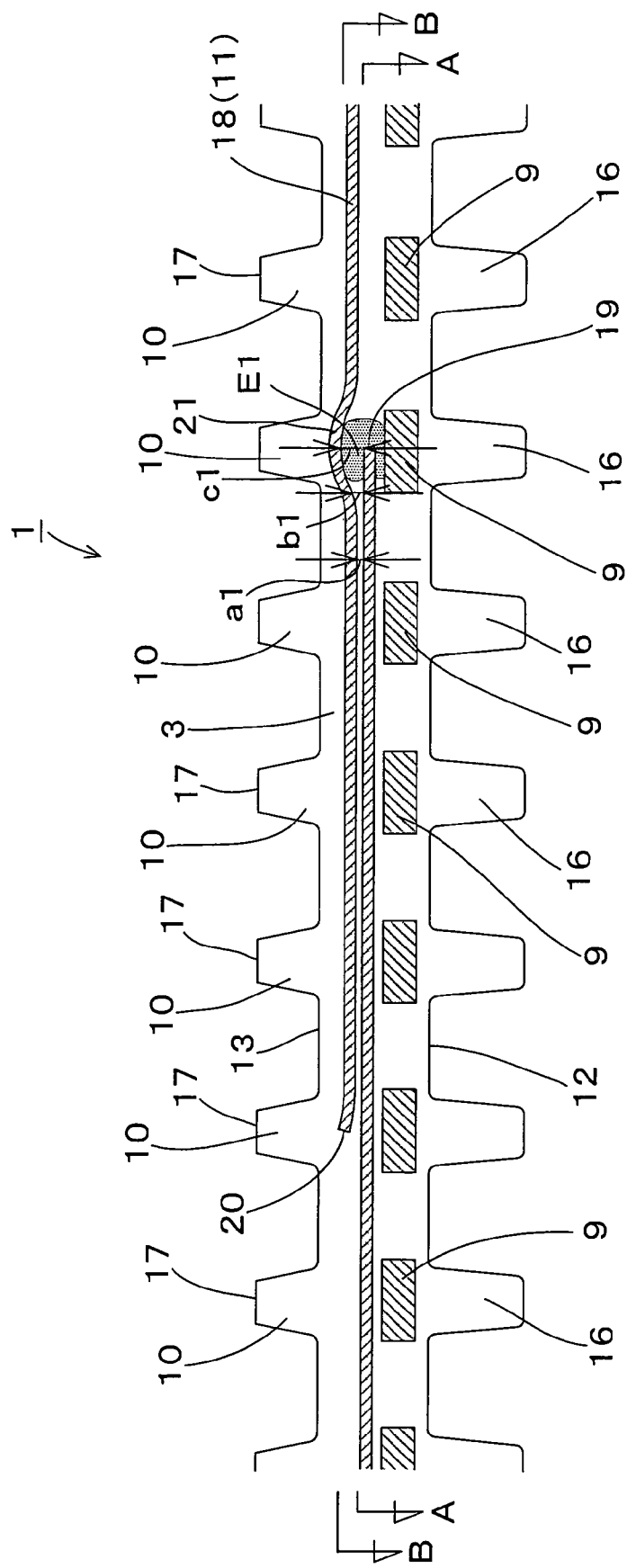
FIG. 2 is a partial schematic cross-sectional side view of the elastic crawler.
Figure 3:
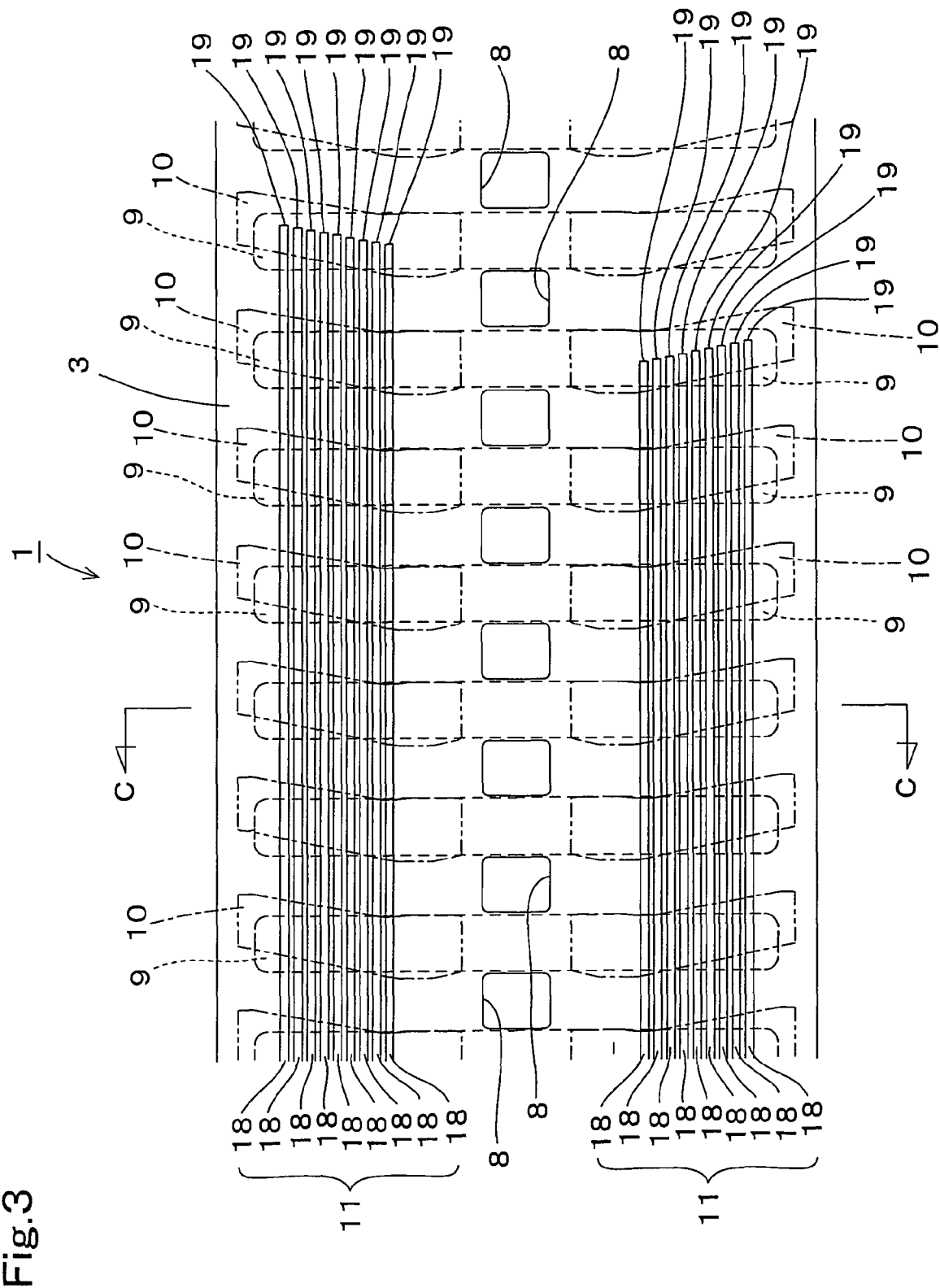
FIG. 3 is a cross-sectional view taken along a line A-A of FIG. 2.

FIG. 1 is a side view of a crawler traveling device 2 to which an elastic crawler 1 according to the present invention is attached. FIG. 2 is a partial schematic cross-sectional side view of the elastic crawler 1. FIG. 3 is a cross-sectional view taken along a line A-A of FIG. 2, FIG. 4 is a cross-sectional view taken along a line B-B of FIG. 2, and FIG. 5 is a cross-sectional view taken along a line C-C of FIG. 3.

Figure 4:
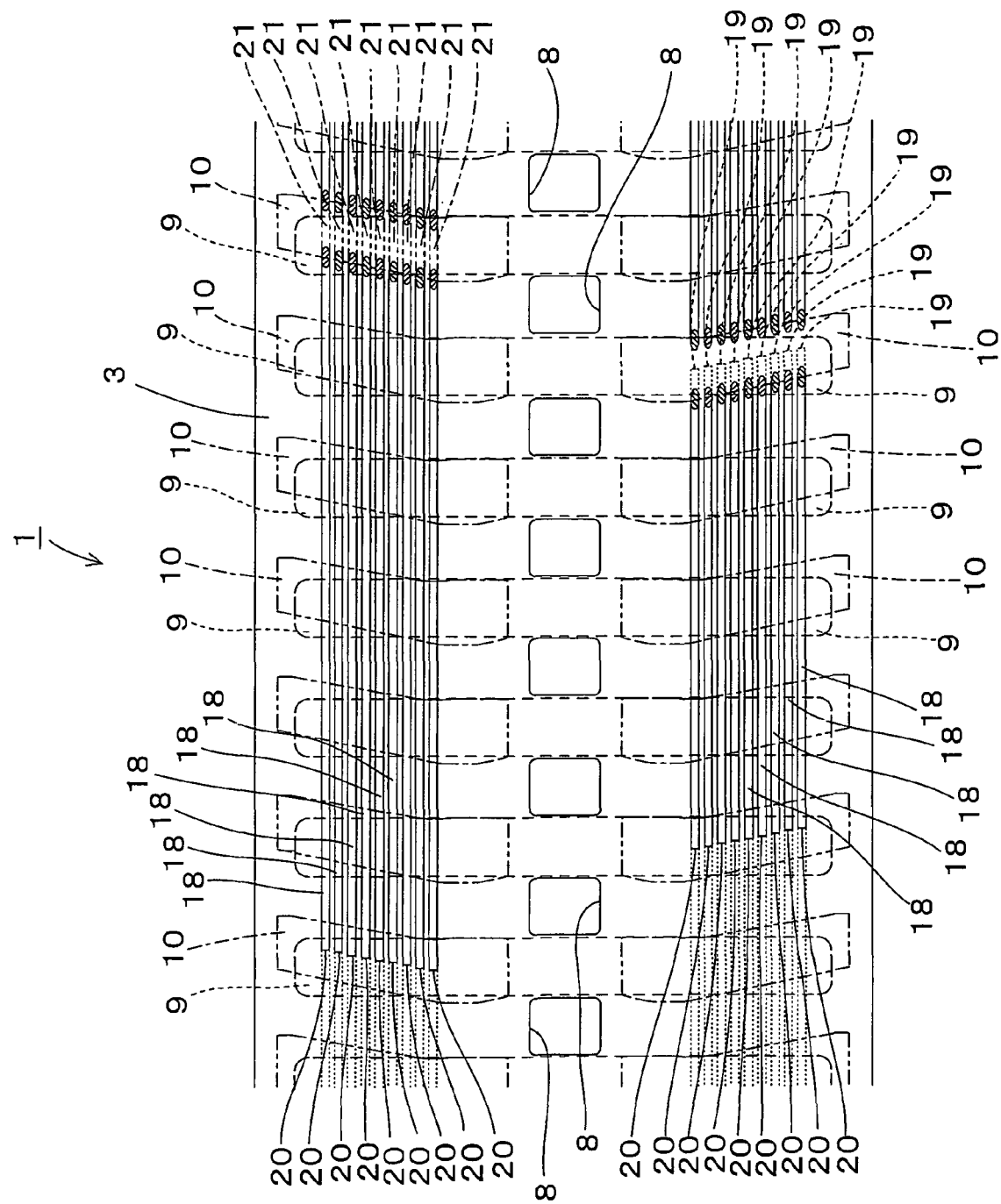
FIG. 4 is a cross-sectional view taken along a line B-B of FIG. 2.
Figure 5:
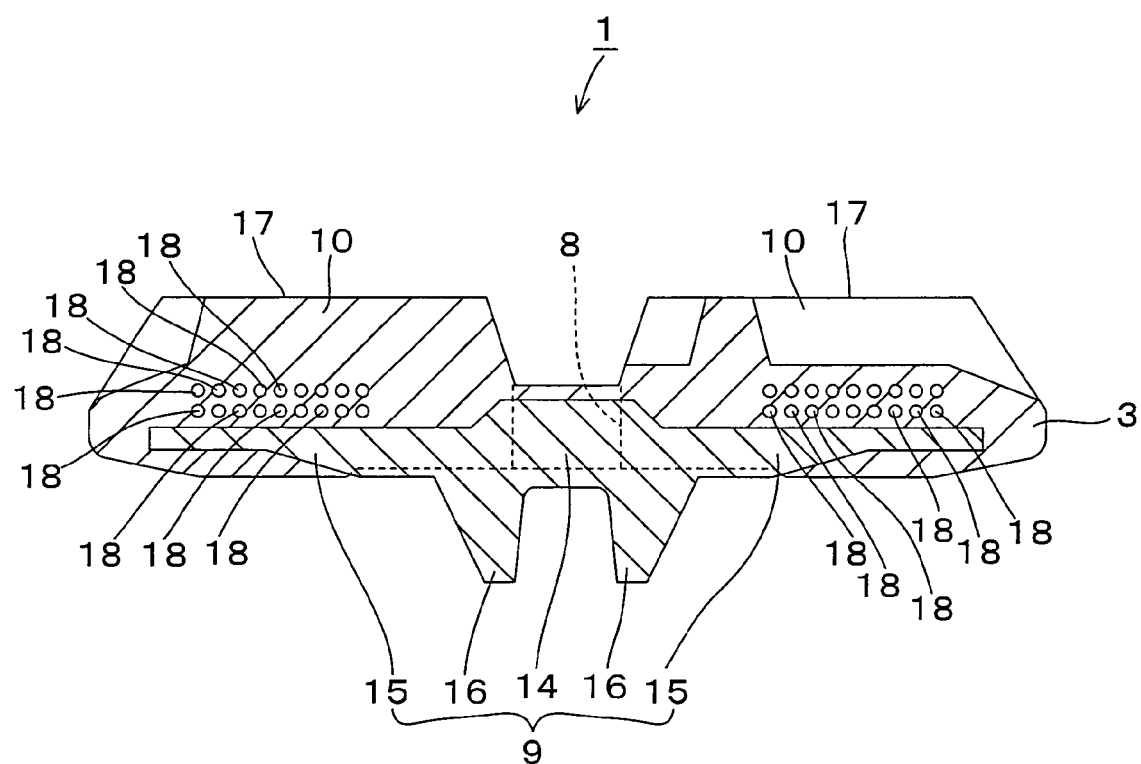
FIG. 5 is a cross-sectional view taken along a line C-C of FIG. 3.

In FIGS. 2 to 4, a crawler body 3 is not hatched.

Referring to FIG. 1, the crawler traveling device 2 is configured to include drive sprockets (drive wheels) 4 provided on respective both sides in one of front and rear portions in a traveling direction, idlers (rolling wheels) 5 provided on respective both sides in the other portion, a plurality of rollers 6 provided on the both sides, and the elastic crawler 1 wound around the drive sprockets 4 and the like on the both sides.

An inner circumference side of the elastic crawler 1 when being wound around the drive sprockets 4, the idlers 5, and the like will be referred to as an "inner circumference side", and an outer side (a ground surface side) thereof will be referred to as an "outer circumference side", hereinafter. Further, a moving direction of the elastic crawler 1 when the crawler traveling device 2 travels will be referred to as "circumferential direction", and a direction orthogonal and horizontal to the circumferential direction will be referred to as "transverse direction", hereinafter.

Each of the drive sprockets 4 includes a plurality of teeth 7 on its outer circumference and makes a rotational movement by a power unit arranged in the crawler traveling device 2. Each of the drive sprockets 4 is designed to engage the teeth 7 with engagement holes 8, to be described later, of the elastic crawler 1 to circularly move the elastic crawler 1 in the circumferential direction of the crawler 1, thereby traveling the crawler traveling device 2.

Each of the idlers 5 freely rotates without being coupled to the power unit or the like, and folds back the elastic crawler 1 wound around the idlers 5, thereby enabling the elastic crawler 1 to circularly move in the circumferential direction.

A plurality of rollers 6 is arranged side by side in a lower portion of the crawler traveling device 2 in a longitudinal direction of the device 2. Each of the rollers 6 freely rotates and a height of the roller 6 from a traveling surface of the crawler traveling device 2 is defined by the elastic crawler 1 supported below the rollers 6.

Referring to FIGS. 2 to 5, the elastic crawler 1 is configured to include a crawler body 3, metal cores 9, lugs 10, and tensile bodies 11.

The crawler body 3 serves as a base of the elastic crawler 1 formed endlessly. The crawler body 3 includes a plurality of engagement holes 8 penetrating from an inner surface 12 of the crawler body 3 to an outer surface (a ground side surface) 13 thereof and arranged equidistantly at a center of the crawler body 13 in the transverse direction over an entire circumference of the crawler body 3.

The metal cores 9 are made of a hard material such as metal. Each of the metal cores 9 is arranged between the two adjacent engagement holes 8 so that a longitudinal direction of the metal core 9 is orthogonal to the circumferential direction of the crawler body 3, and a part of the metal core 9 is embedded in the crawler body 3. Each of the metal cores 9 is configured to include a central portion 14 that occupies the center of the crawler body 3 in the transverse direction of the crawler body 3 (hereinafter, often simply "transverse direction"), vanes 15 extending from the both sides of the central portion 14 in the transverse direction toward lateral ends of the crawler body 3, respectively, a pair of core protrusions 16 protruding outwardly from the central portion 14 of the inner surface 12 of the crawler body 3 and arranged side by side in the transverse direction.

The core protrusions 16 are engaged with the drive sprockets 4, the idlers 5, and the rollers 6, thereby preventing the elastic crawler 1 from being released from the drive sprockets 4, the idlers 5, and the rollers 6 during traveling.

The lugs 10 protruding outwardly from positions overlapped with the metal cores 9 in the circumferential direction are provided equidistantly over the entire circumference of the outer surface 13 of the crawler body 3. The lugs 10 are provided in pairs in the transverse direction and each of each pair of lugs 10 extends from a position in the vicinity of an end of the engagement hole 8 to a position in the vicinity of the lateral end of the engagement hole 8 on one of the sides in the transverse direction. Each of the lugs 10 is formed so that a longitudinal direction of a ground surface (top surface) 17 of the lug 10 is not at right angle with respect to the circumferential direction but inclined therefrom at a predetermined angle. The lugs 10 are formed symmetric about arrangement of the engagement holes 8 on the both sides in the transverse direction.

Each of the tensile bodies 11 is configured to include a plurality of tensile cords 18 such as steel cords. The tensile bodies 11 are formed by arranging the tensile cords 18 at substantially uniform intervals in the transverse direction. Each group of tensile bodies 11 is arranged between the engagement hole 8 and both ends of the crawler body 3 in the transverse direction so as to be wound on outer circumference side of the vanes 15 of the metal core 9 and so that vicinity portions of ends 19 and 20 are overlapped with each other, and embedded in the crawler body 3 (FIG. 2). Further, the vicinity portions both ends 19 and 20 of the respective tensile cords 18 of each tensile body 11 are overlapped over a distance of three to four metal cores 9 arranged in the circumferential direction. The tensile cords 18 are arranged altogether so that inner circumference side ends 19 and outer circumference side ends 20 are inclined with respect to the circumferential direction almost similarly to inclination of ground surfaces 17 of the lugs 10. Moreover, the tensile cords 18 are arranged so that ranges of the ends 19 and 20 arranged altogether are present between the metal cores 9 and the lugs 10 (FIG. 3).

Each of the tensile cords 18 includes, on the outer circumference side portion thereof overlapped with the vicinity portion of the inner circumference side end 19, a bent portion 21 outwardly curved to secure a larger distance between the overlapping portions of the tensile cord 18 than that between the rest of the overlapping portions (FIG. 2). The bent portions 21 are arranged side by side so that each bent portion 21 is arranged between the metal core 9 and the lug 10. The bent portions 21 are arranged side by side so as to be inclined with respect to the circumferential direction almost similarly to the inclination of the ground surfaces 17 of the lugs 10 (FIG. 4).

By providing the bent portions 21 on the outer circumference side portions overlapped with the vicinity portions of the inner circumference side ends 19 of the respective tensile cords 18, a distance between the vicinity portion of the inner circumference side end 19 and the outer circumference side portion of each tensile cord 18 overlapped with the vicinity portion of the inner circumference side end 19 is increased from the vicinity portion of the inner circumference side end 19 to the inner circumference side end 19. Preferably, the range over which the increasing distance of the vicinity portion of the inner circumference side end 19 relative to the outer circumference side portion is provided is within, as measured from the inner circumference side end 19, a larger one of the distance between the centers of two adjacent metal cores 9 in the circumferential direction and the distance between the centers of the lugs 10.

Moreover, the inner circumference side end 19 of each tensile cord 18 is arranged between the bent portion 21 and the metal core 9.

Preferably, the distance between the bent portion 21 and the inner circumference side portion of the tensile cord 18 satisfies $b1 \geqq 1.5 \times a1$ and $c1 \leqq 3.5 \times a1$, where a1 denotes the distance between the rest of the overlapping portions, b1 denotes the distance between the bent portion 21 and the inner circumference side portion at the portion where the inner circumference side portion starts overlapping with the metal core 9, and c1 denotes the largest distance between the bent portion 21 and the inner circumference side portion.

In the case where the tensile bodies 11 are formed so that the overlap distance is gradually increased from the portions at which the overlap starts toward the end, the difference in strain between the outer circumference side portion and the inner circumference side portion of the tensile body 11 during bending and a strain between the both ends generated due to the difference in bending curvature therebetween can be alleviated.

Figure 6:
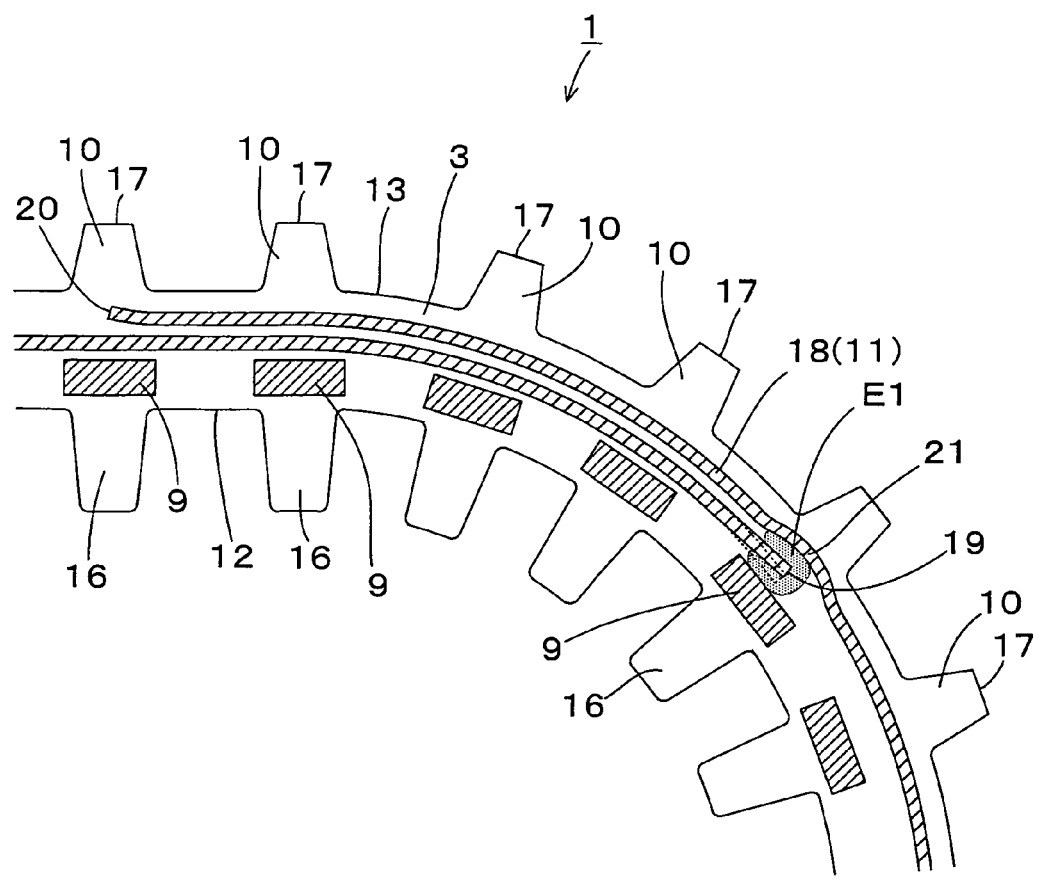
FIG. 6 is a schematic cross-sectional side view of the elastic crawler when the inner circumference side end of the tensile cord travels on the drive sprocket.

FIG. 6 is a schematic cross-sectional side view of the elastic crawler 1 when the inner circumference side end 19 of the tensile cord 18 travels on the drive sprocket 4.

The elastic crawler 1 is wound around the drive sprockets 4, the idlers 5, and a plurality of rollers 6, and circularly moves around the drive sprockets 4, the idlers 5, and the rollers 6 by rotation of the drive sprockets 4, thereby moving the crawler traveling device 2 forward or backward. The tensile bodies 11 are bent into a generally semicircular shape when the elastic crawler 1 travels on the drive sprockets 4 and the idlers 5. When the elastic crawler 1 travels on the drive sprockets 4 and the idlers 5, the continuous portion excluding the vicinity portions of the ends 19 and 20 of each tensile cord 18 equally receive the same bending moment and are curved at almost the same curvature. On the other hand, when the inner circumference side end 19 of the tensile cord 18 travels on the drive sprockets 4 or the idlers 5, a bending moment applied to the vicinity portion of the inner circumference side end 19 is lower than that applied to the continuous portions. A bending degree of the vicinity portion of the inner circumference side end 19 is smaller than that of the portion continuous from the vicinity portion (see a broken line shown in FIG. 6).

One cause for the conventional problems, i.e., the cracking due to the fatigue of the elastic body in the elastic crawler, the release of the elastic body from the tensile bodies 11, and the like is excessive compression of the elastic body due to less flexibility of the vicinity portion of the inner circumference side end 19 of the tensile cord 18.

In the elastic crawler 1, the bent portion 21 is provided on the outer circumference side portion of the tensile cord 18 in the vicinity of the inner circumference side end 19 of the tensile cord 18 to secure a larger distance between the tensile cord 18 and the vicinity portion of the inner circumference side end 19 of the tensile cord 18.

Due to this, as shown in FIG. 6, the thickness of an elastic body E1 filled up between the vicinity of the inner circumference side end 19 and the outer circumference side portion of the tensile cord 18 is large as compared with the thickness in the case where the bent portion 21 is not provided. A compressive strain (thickness change/thickness) generated in the elastic body E1 when the inner circumference side end 19 of the tensile cord 18 travels on the drive sprocket 4 or the idler 5 is smaller if the thickness is larger. Therefore, the elastic crawler 1 can reduce a degree of the compressive strain repeatedly generated in the elastic body E. Further, the elastic body E1 is thicker around the inner circumference side end 19 of the tensile cord 18, so that it is possible to avoid concentration of a compressive stress on a specific region of the elastic body E.

In this manner, by reducing the compressive strain, the elastic crawler 1 can reduce the stress generated in the elastic body E1, and relax the adverse effect of the concentration of the generation of the compressive stress on a specific narrow range. Since the fatigue of the elastic body E1 can be reduced, the elastic crawler 1 can ensure high fatigue resistance.

Moreover, the elastic crawler 1 is formed so that all the inner circumference side ends 19 of the tensile cords 18 are arranged at the inner circumference side of (on the inner circumference side relative to) the lugs 10. The portion where each lug 10 is provided has high rigidity because of the thickness of the lug 10, and is subjected to a smaller compressive strain when each tensile cord 18 travels on the drive sprocket 4 or the idler 5 or is grounded on a surface having many irregularities. The elastic crawler 1 in which the inner circumference side ends 19 of the tensile cords 18 are arranged in the portions where the lugs 10 are provided can suppress the compressive strain of the elastic body in the vicinity of the tensile cords 18, reduce the fatigue of the elastic body, and ensure high durability.

The elastic crawler 1 is configured so that the inner circumference side ends 19 and the bent portions 21 of the tensile cords 18 are arranged between the lugs 10 and the vanes 15. Even in the case where the inner circumference side ends 19 and the bent portions 21 of the tensile cords 18 are arranged to satisfy the requirement of arranging the inner circumference side ends 19 and the bent portions 21 at the inner circumference side of the lugs 10 or at the outer circumference side of the vanes 15 or arranged not to satisfy either requirements, the inner circumference side ends 19 and the bent portions 21 are overlapped with one another to increase the thickness of the elastic body E1 therebetween. It is thereby possible to obtain a certain effect of improvement in durability.

Figure 7:
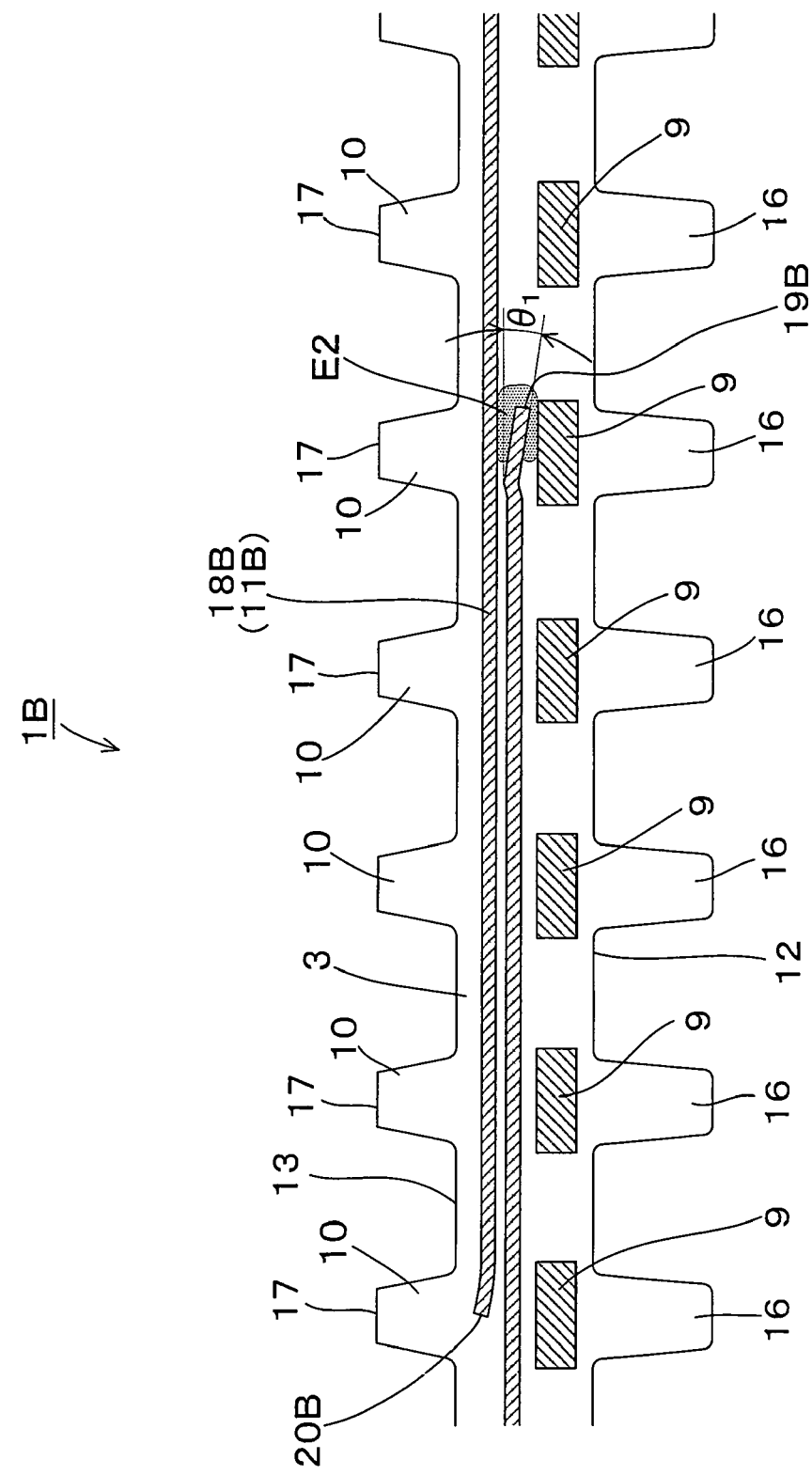
FIG. 7 is a partial schematic cross-sectional side view of an elastic crawler according to another embodiment of the present invention.

FIG. 7 is a partial schematic cross-sectional side view of an elastic crawler 1B according to another embodiment of the present invention.

The elastic crawler 1B is configured to include a crawler body 3, metal cores 9, lugs 10, and tensile bodies 11B. The crawler body 3, the metal cores 9, and the lugs 10 are similar to those of the elastic crawler 1 according to the previous embodiment. In FIG. 7, the crawler body, the metal cores, and the lugs are denoted by the same reference symbols as those according to the elastic crawler 1 of the previous embodiment and will not be described.

Each of the tensile bodies 11B is configured to include a plurality of tensile cords 18B such as steel cords aligned in the transverse direction. Each of the tensile bodies 11B is arranged so that both ends 19B and 20B are inclined with respect to the circumferential direction almost similarly to the inclination of the ground surface 17 of each of the lugs 10 and so that each of the ends 19B and 20B is arranged between the lug 10 and the metal core 9. Further, the tensile cords 18B of each tensile body 11B are arranged side by side so that the both ends 19B and 20B are inclined with respect to the circumferential direction almost similarly to the inclination of the ground surface 17 of each lug 10 and so that each of the both ends 19B and 20B is arranged between the metal core 9 and the lug 10. Arrangement of the ends 19B and 20B is similar to that of the ends 19 and 20 in the elastic crawler 1.

Portions continuous to the ends 19B and 20B of the tensile cords 18B are overlapped over a distance of three to four metal cores 9 arranged in the circumferential direction. The inner circumference side end 19B of the tensile cord 18B is inclined toward the metal core 9 (the inner circumference side) in a range from the inner circumference side end 19B to a length generally corresponding to or smaller than a width of the metal core 9 in the circumferential direction so as to be closer to the metal core 9 side between the metal core 9 and the lug 10. An inclination angle θ1 in the vicinity of the inner circumference side end 19B is preferably 2 to 15 degrees with respect to a portion of the tensile cord 18B before inclination in a state (in which the inner circumference side end 19B does not travel on the drive sprocket 4 or the like) shown in FIG. 7.

In this manner, by inclining the vicinity portion of the inner circumference side end 19B of each tensile cord 18B relative to the outer circumference side portion of the tensile cord 18B, the distance between the vicinity portion and the outer circumference side portion of the tensile cord 18B overlapped with the vicinity portion is increased from the vicinity portion toward the inner circumference side end 19B. Furthermore, by increasing the distance between the vicinity portion of the inner circumference side end 19B and the outer circumference side portion of the tensile cord 18B to increase the thickness of an elastic body E2 therebetween, the elastic crawler 1B can reduce a compressive strain of the elastic body E2 in the vicinity of the inner circumference side end 19B, which is difficult to bend when traveling on the drive sprocket 4 or the like, and realize improvement in fatigue resistance.

Constituent elements of the tensile cord 18B other than those described above are almost similar to those of the tensile cord 18 of the elastic crawler 1.

Preferably, the range over which the increasing distance between the vicinity portion of the inner circumference side end 19B and the outer circumference side portion of the tensile cord 18B toward the inner circumference side end 19B is provided as measured from the inner circumference side end 19B is within a maximum distance, which is a larger one of the distance between the centers of two adjacent metal cores 9 in the circumferential direction and the distance between the centers of the lugs 10.

Figure 8:
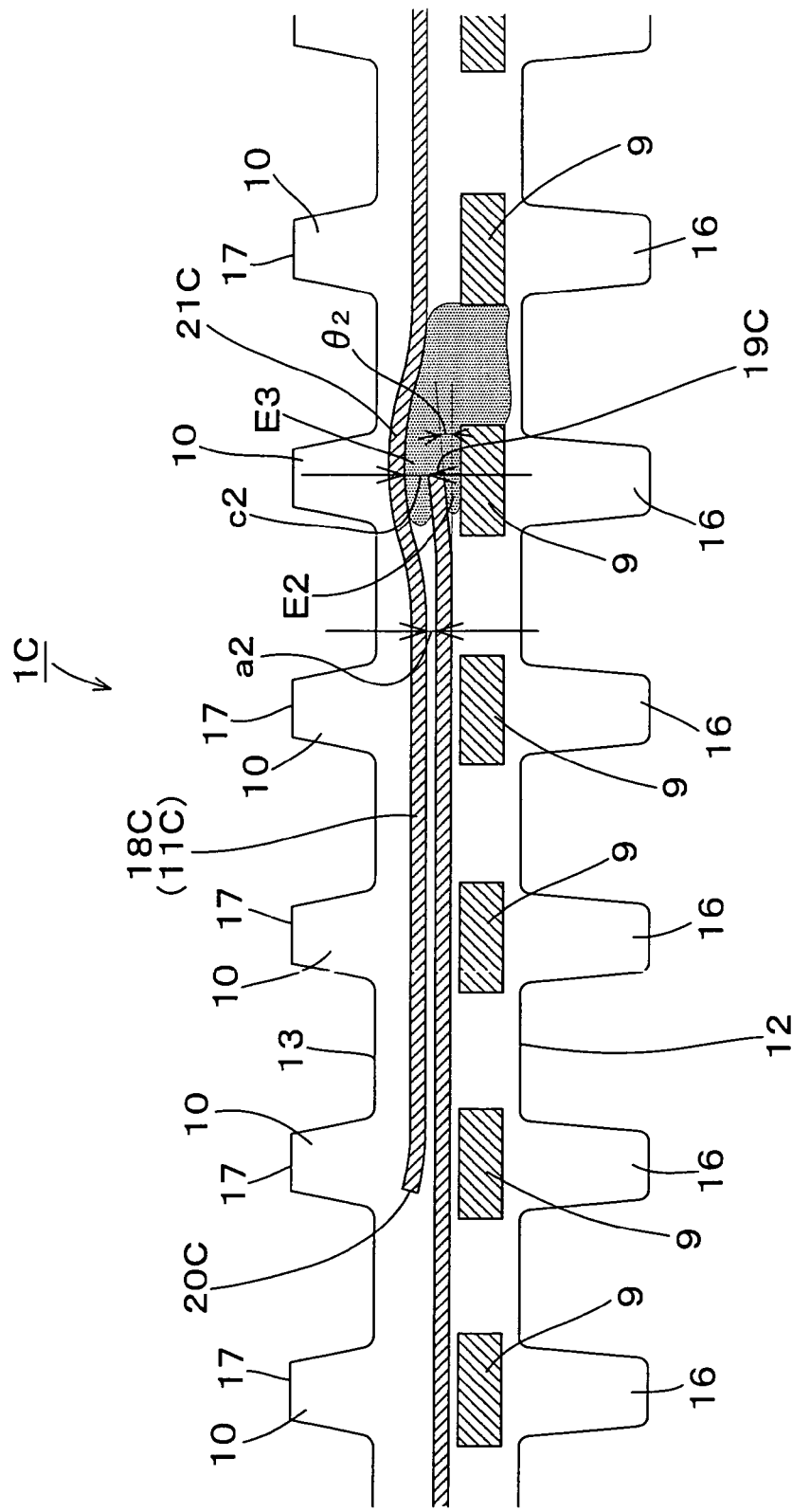
FIG. 8 is a partial schematic cross-sectional side view of an elastic crawler according to yet another embodiment of the present invention.

FIG. 8 is a partial schematic cross-sectional side view of an elastic crawler 1C according to yet another embodiment of the present invention.

In the elastic crawler 1C, configurations of a crawler body 3 except for tensile bodies 11C, metal cores 9, and lugs 10 are almost similar to those of the elastic crawler 1. In FIG. 8, the same constituent elements of the elastic crawler 1C as those of the elastic crawler 1 are denoted by the same reference symbols and will not be described herein.

Each of the tensile cords 18C constituting each tensile body 11C includes a bent portion 21C outwardly bent on the outer circumference side portion of the tensile cord 18C overlapped with a vicinity portion of an inner circumference side end 19C, similarly to the tensile cords 18. The bent portions 21C are arranged side by side so that each bent portion 21C is arranged between the metal core 9 and the lug 10. A range of the bent portions 21C in the transverse direction is inclined with respect to the circumferential direction almost similarly to the inclination of the ground surface 17 of the lug 10. The inner circumference side end 19C of the tensile cord 18C is arranged between the bent portion 21C and the metal core 9. The vicinity portion of the inner circumference side end 19C is inclined toward the bent portion 21C (outer circumference side).

As a result of inclination of the vicinity portion of the inner circumference side end 19C toward the outer circumference side so as to be closer to the bent portion 21C, a distance between the inner circumference side end 19C of each tensile cord 18C and the vane 15 arranged at the inner circumference side of the inner circumference side end 19C is larger than the distance between the inner circumference side portion of the tensile cord 18C and the other vanes 15 at the rest of the overlapping portions of the tensile cord 18C.

An inclination angle θ2 of the vicinity portion of the inner circumference side end 19C is preferably 2 to 10 degrees with respect to a portion of the tensile cord 18C before inclination. For a largest distance c2 of the bent portion 21C relative to a distance a2 in the rest of the overlapping portions, the preferable range specified for c1 relative to a1 for the elastic crawler 1 applies here.

Each of the tensile cords 18C of the elastic crawler 1C includes the bent portion 21C on the outer circumference side portion of the tensile cord 18C, and the vicinity portion of the inner circumference side end 19C of the tensile cord 18C is inclined toward the outer circumference side. By doing so, the distance between the vicinity portion of the inner circumference side end 19C and the outer circumference side portion of the tensile cord 18C (bent portion 21C) is larger to increase the thickness of an elastic body E3 therebetween. Furthermore, the distance between the vicinity portion of the inner circumference side end 19C and the vane 15 (metal core 9) is larger to increase the thickness of an elastic body E4 therebetween. As a result, the elastic crawler 1C can reduce a compressive strain of the elastic bodies in the vicinity of the inner circumference side end 19C, which is difficult to bend when traveling on the drive sprocket 4 or the like, and realize improvement in fatigue resistance. Moreover, since the elastic bodies around the inner circumference side end 19C are thick, it is possible to relax a movement of the inner circumference side end 19C and thereby relax an influence of a protrusion (compression) of the inner circumference side end 19C.

Furthermore, similarly to the elastic crawlers 1 and 1B, the elastic crawler 1C is configured so that the distance between the vicinity portion of the inner circumference side end 19C of each tensile cord 18C and the outer circumference side portion of the tensile cord 18C overlapped with the vicinity portion is increased from the vicinity portion toward the inner circumference side end 19C. Preferably, the range over which the increasing distance of the vicinity portion of the inner circumference side end 19C relative to the outer circumference side portion is provided is within, as measured from the inner circumference side end 19C, a larger one of the distance between the centers of two adjacent metal cores 9 in the circumferential direction and the distance between the centers of the lugs 10. A combination of a curvature and a length of each bent portion 21C and a degree of the inclination of the vicinity portion of the inner circumference side end 19C is selected to satisfy these requirements.

Constituent elements of the tensile cord 18C other than those described above are almost similar to those of the tensile cord 18 of the elastic crawler 1.

Figure 9:
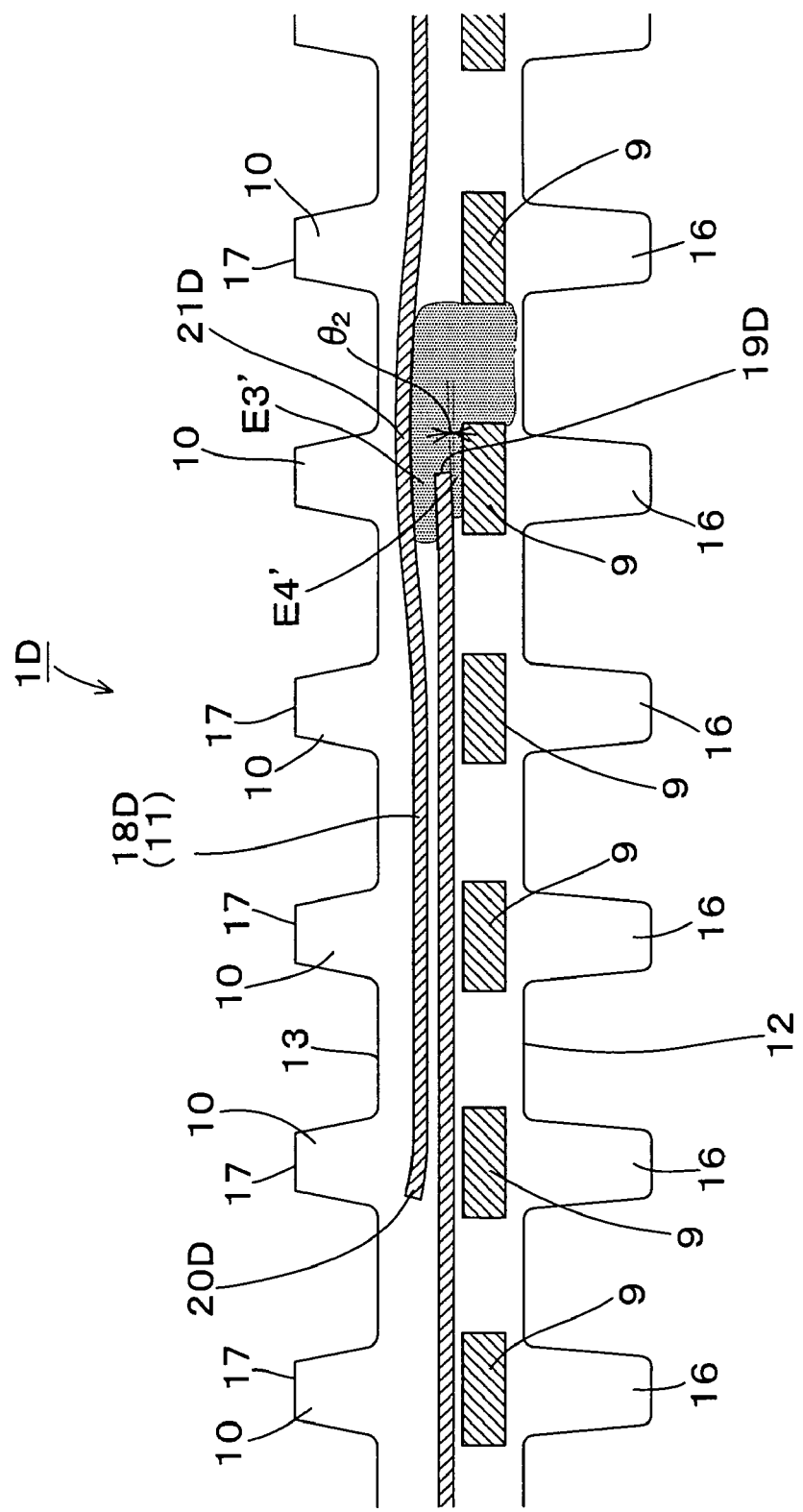
FIG. 9 is a partial schematic cross-sectional side view of an elastic crawler so that a curvature of a bent portion is set low.

FIG. 9 is a partial schematic cross-sectional side view of an elastic crawler 1D configured, as compared with the elastic crawler 1C, so that the curvature of the bent portion 21C is set low.

In the elastic crawler 1D, similarly to the elastic crawler 1C, the thickness of an elastic body E3' between a vicinity portion of an inner circumference side end 19D of each tensile cord 18D and a bent portion 21D thereof and the thickness of an elastic body E4' between the vicinity portion of the inner circumference side end 19D of each tensile cord 18D and the metal core 9 are larger than those of the rest of the overlapping portions. Therefore, similarly to the elastic crawler 1C, it is possible to reduce compressive strains of the elastic bodies E3' and E4' and to improve fatigue resistance of the elastic crawler 1D.

In FIG. 9, the same constituent elements of the elastic crawler 1D as those of the elastic crawler 1C are denoted by the same reference symbols shown in FIG. 8.

Figure 10:
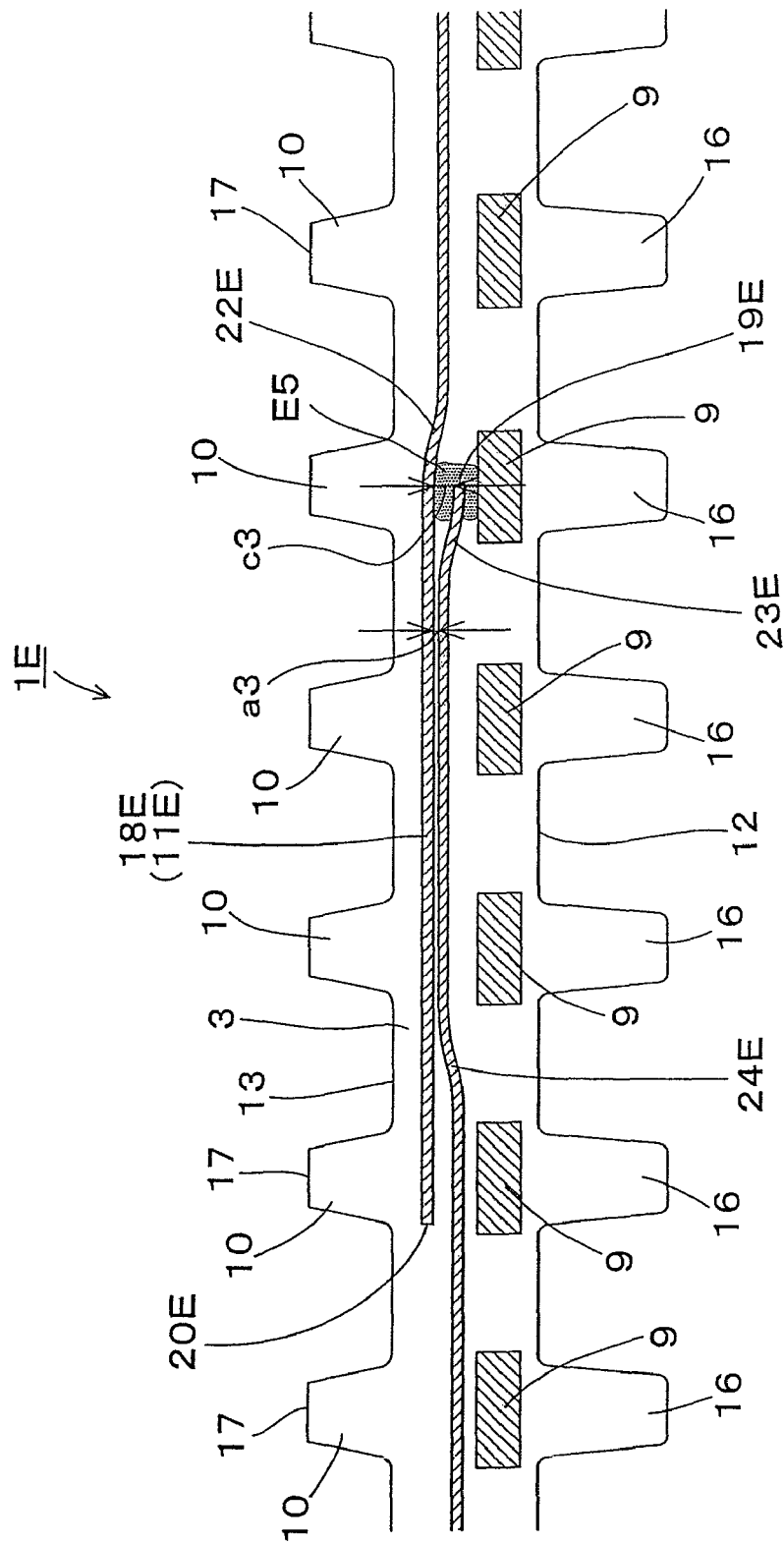
FIG. 10 is a schematic cross-sectional side view of an elastic crawler according to yet another embodiment of the present invention.

FIG. 10 is a schematic cross-sectional side view of an elastic crawler 1E according to yet another embodiment of the present invention.

In the elastic crawler 1E, configurations of a crawler body 3 except for tensile bodies 11E, metal cores 9, and lugs 10 are almost similar to those of the elastic crawler 1. In FIG. 10, the same constituent elements of the elastic crawler 1E as those of the elastic crawler 1 are denoted by the same reference symbols and will not be described herein.

Each of tensile cords 18E constituting each of the tensile bodies 11E has a step (outer step) 22E formed on the outer circumference side portion of the tensile cord 18E overlapped with a vicinity portion of an inner circumference side end 19E of the tensile cord 18E. The tensile cord 18E is deviated toward the outer circumference side over the outer step 22E and closer to the outer surface 13 of the crawler body 3, and the deviated state continues to an outer circumference side end 20E of the tensile cord 18E. Namely, a portion starting being overlapped with the vicinity portion of the inner circumference side end 19E up to the outer circumference side end 20E of the outer circumference side portion of the tensile cord 18E is farther away from the inner surface 12 of the crawler body 3 than the portion behind the overlap-starting portion.

A step (an inner step) 23E is formed in the vicinity of the inner circumference side end 19E of each tensile cord 18E for making the inner circumference side portion of the tensile cord 18E closer to the outer circumference side portion of the tensile cord 18E over an area in the vicinity of the outer circumference side end 20E. Further, a step (end step) 24E is formed in the vicinity of the inner circumference side end 19E of each tensile cord 18E for returning to the original position of the tensile cord 18E behind the inner step 23E. A predetermined distance c3 is formed between the inner circumference side end 19E of each tensile cord 18E and the outer circumference side portion of the tensile cord 18E overlapped with the inner circumference side end 19E.

Similarly to the elastic crawlers 1 and 1B to 1D, the elastic crawler 1E is configured so that the distance between the vicinity portion of the inner circumference side end 19E of each tensile cord 18E and the outer circumference side portion of the tensile cord 18E overlapped with the inner circumference side end 19E is increased from the vicinity portion of the inner circumference side end 19E toward the inner circumference side end 19E. The range over which the increasing distance between the vicinity portion of the inner circumference side end 19E and the outer circumference side portion of the tensile cord 18E toward the inner circumference side end 19E is provided as measured from the inner circumference side end 19E is within a maximum distance, which is a larger one of the distance between the centers of two adjacent metal cores 9 in the circumferential direction and the distance between the centers of the lugs 10.

The elastic crawler 1E is similar to the elastic crawlers 1 and 1B to 1D in that the inner circumference side ends 19E of the respective tensile cords 18E are arranged side by side so as to be arranged between the metal cores 9 and the lugs 10.

In the elastic crawler 11E, by providing the outer step 22E, the inner step 23E, and the end step 24E in each tensile cord 18E, the thickness of an elastic body E5 between the vicinity portion of the inner circumference side end 19E of each tensile cord 18E and the outer circumference side portion of the tensile cord 18E can be made larger than that of the rest of the overlapping portions. Therefore, for the same reason as those for the elastic crawlers 1 and 1B to 1D, it is possible to improve fatigue resistance of the elastic crawler 1E.

For a distance c3 between the inner circumference side end 19E and the outer circumference side portion of the tensile cord 18E relative to a distance a3 in the overlapping portions of the tensile cord 18E, the preferable range specified for c1 relative to a1 for the elastic crawler 1 applies here.

Figure 11:
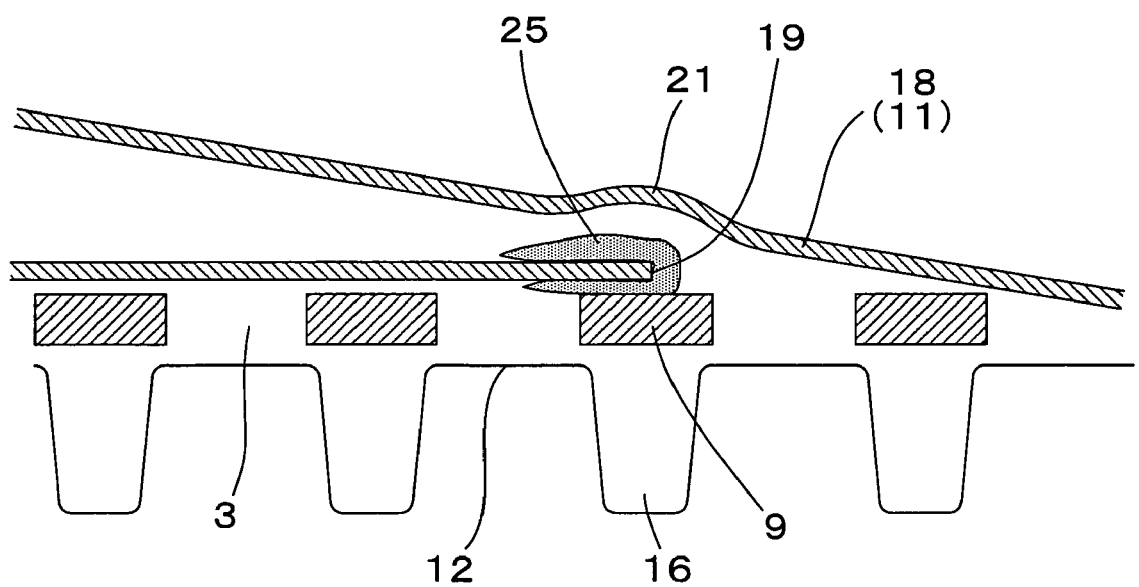
FIG. 11 is a schematic diagram showing a process of manufacturing the elastic crawler.

FIG. 11 is a schematic diagram showing a process of manufacturing the elastic crawler 1.

Referring to FIG. 11, to manufacture the tensile body 11, vicinity portions of the inner circumference side ends 19 of the tensile cords 18 arranged in line are put between both sides of an unvulcanized sheet rubber 25 folded into a U shape. The vicinity portions of the inner circumference side ends 19 of the tensile cords 18 put between both sides of the unvulcanized sheet rubber 25 are arranged at an outer circumference side of any one of the metal cores 9 so as to put one side of the U-shaped bent rubber 25 between the vicinity portions and the metal core 9. The outer circumference side portion of each of the tensile cords 18 is overlapped over the inner circumference side portion of the tensile cord 18 so that the bent portion 21 is arranged at an outer circumference side of the inner circumference side end 19 of the tensile cord 18 via the rubber 25.

The elastic crawler 1 is manufactured by subsequently vulcanizing the rubber 25 to make the rubber 25 elastic.

Each of the ends of all the tensile cords 18 constituting the tensile body 11 is put between the two sides of the unvulcanized U-shaped bent rubber 25, thereby making it advantageously possible to relax the compressive stresses applied to the ends of all the tensile cords 18 as a whole. Furthermore, since it suffices to use only one component, it is efficient to enable high operatively.

On the other hand, in the case where, for example, the ends of some of the tensile cords 18 are put between the two sides of the unvulcanized sheet rubber 25 folded into a U shape, portions on which the stress concentrates during bending are disadvantageously generated due to differences in expansion, compression, strain, and the like among different types of rubber having different vulcanization histories.

The manufacturing of the elastic crawler 1 using the unvulcanized sheet rubber bent into the U-shape is applicable to manufacturing of the other elastic crawlers 1B to 1E and that of similar elastic crawlers.

In the embodiments, the present invention can be applied to elastic crawlers 1F and 1G different in arrangement, shapes, and the like of the metal cores 9, the lugs 10, and the like.

Figure 12:
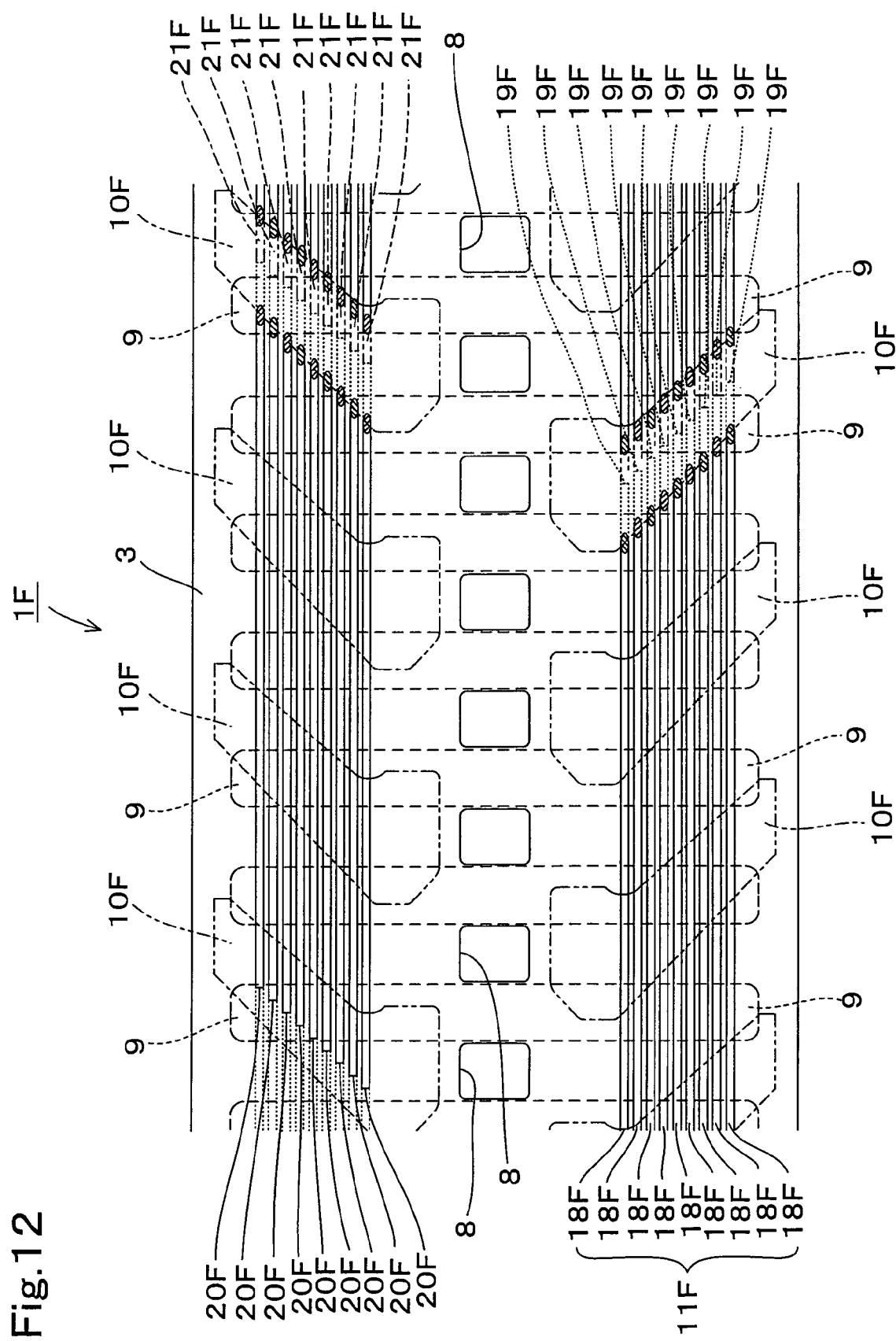
FIG. 12 is a cross-sectional view taken along a line C-C of FIG. 3 according to yet another embodiment of the present invention.

For example, as shown in FIG. 12, lugs 10F may be arranged circumferentially and alternately only on one side of the engagement holes 8 in the transverse direction, and all of ends 19F of the inner circumference side portions of the tensile cords 18F constituting the tensile bodies 11F and all of bent portions 21F on the outer circumference side portions of the tensile cords 18F may be arranged at the inner circumference side of a single lug 10F. All of outer circumference side ends 20F of the tensile cords 18F are also arranged at the inner circumference side of a single lug 10F. In FIG. 12, the same constituent elements of the elastic crawler 1F as those of the elastic crawler 1 are denoted by the same reference symbols as those denoting the respective constituent elements.

Figure 13:
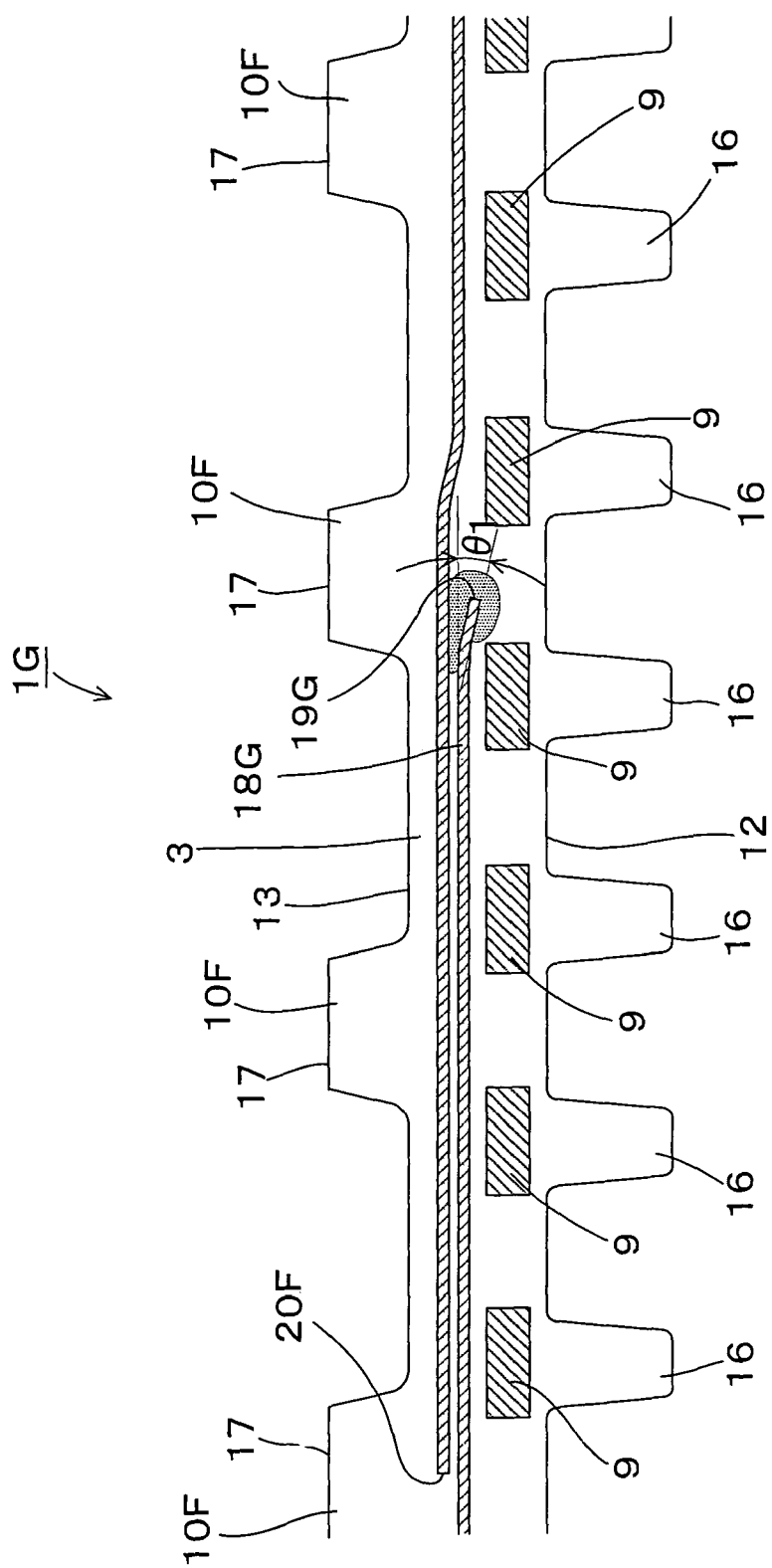
FIG. 13 is a partial schematic cross-sectional side view of an elastic crawler according to yet another embodiment of the present invention.

Moreover, as shown in FIG. 13, in an elastic crawler 1G in which the lugs 10F are provided alternately in the transverse direction as shown in FIG. 12, a vicinity portion of an end 19G of the inner circumference side portion of the tensile cord 18G may be inclined inwardly. In this case, an inclination angle $\theta 1$ is preferably 2 to 15 degrees with respect to a portion of the tensile cord 18G before inclination, similarly to the inclination angle of the elastic crawler 1B. In FIG. 13, the same constituent elements of the elastic crawler 1G as those of the elastic crawler 1 or 1F are denoted by the same reference symbols as those denoting the respective constituent elements.

Furthermore, it is possible to appropriately change the crawler traveling device 2 and the elastic crawlers 1 and 1B to 1G and the respective configurations or overall structure, shapes, dimensions, numbers, materials and the like of the crawler traveling device 2 and the elastic crawlers 1 and 1B to 1G, within the scope of the present invention.

INDUSTRIAL APPLICABILITY

The present invention can be used for an elastic crawler in a crawler traveling device used as a civil engineering machine, a construction machine, an agricultural machine or the like.

What is claimed is:
1. An elastic crawler comprising:
a crawler body comprising an elastic body in the form of an endless belt;
a plurality of metal cores embedded in the crawler body, each of the metal cores including vanes extending toward lateral ends of the crawler body and arranged at predetermined intervals in a circumferential direction of the crawler body; and
a plurality of tensile cords arranged in a transverse direction of the crawler body, wound around an outer circumference side of the vanes, and embedded in the crawler body while portions of both ends of each of the tensile cords are overlapped with one another in a predetermined length, wherein:
an inner circumference side end of each of the tensile cords is arranged at an outer circumference side of one of the vanes; and
a distance between a portion from a vicinity portion of the inner circumference side end of each of the tensile cords to the inner circumference side end and an outer circumference side portion of the tensile cord overlapped with the portion from the vicinity portion to the inner circumference side end is increased from the vicinity portion toward the inner circumference side end or is larger than a distance between the rest of the overlapping portions of the tensile cord.

2. The elastic crawler according to claim 1, wherein each of the tensile cords includes:
a first step provided in the vicinity of the inner circumference side end of the tensile cord so that the inner circumference side end is arranged further on an inner circumference side than an opposite side; and
a second step provided in vicinity of a starting point so that a portion of overlapping of the outer circumference side portion of the tensile cord ranging from the starting point of overlapping or from a portion in immediate vicinity of the starting point to an outer circumference side end of the tensile cord is arranged further on an outer circumference side than other non-overlapping portion.

3. The elastic crawler according to claim 2, comprising a plurality of lugs arranged in the circumferential direction of the crawler body and protruding outwardly at predetermined intervals from an outer surface of the crawler body,
wherein the inner circumference side end of each of the tensile cords is arranged at the inner circumference side of one of the lugs.

4. A method of manufacturing for manufacturing the elastic crawler according to claim 1, comprising the steps of:
wrapping the inner circumference side end of each of the tensile cords along a crease of an unvulcanized sheet rubber folded into a U shape; and
after the wrapping step, overlapping the outer circumference side portion of each of the tensile cords over the inner circumference side portion thereof and vulcanizing the unvulcanized sheet rubber.

5. An elastic crawler comprising:
a crawler body comprising an elastic body in the form of an endless belt;
a plurality of lugs arranged at predetermined intervals in a circumferential direction of the crawler body and protruding outwardly from an outer surface of the crawler body; and
a plurality of tensile cords arranged in a transverse direction of the crawler body and embedded in the crawler body while portions of both ends of each of the tensile cords are overlapped with one another in a predetermined length, wherein:
an inner circumference side end of each of the tensile cords is arranged at the inner circumference side of one of the lugs; and
a portion from a vicinity portion of the inner circumference side end of each of the tensile cords to the inner circumference side end is bent so that a distance between the portion from the vicinity portion to the inner circumference side end and an outer circumference side portion of the tensile cord overlapped with the portion from the vicinity portion to the inner circumference side end is increased from the vicinity portion toward the inner circumference side end.

6. The elastic crawler according to claim 5, wherein:
at least one group of the plurality of tensile cords is arranged at substantially uniform intervals in the transverse direction of the crawler body; and
the inner circumference side ends of the group of the plurality of tensile cords are arranged at the inner circumference side of the one of the lugs.

7. A method of manufacturing for manufacturing the elastic crawler according to claim 5, comprising the steps of:
wrapping the inner circumference side end of each of the tensile cords along a crease of an unvulcanized sheet rubber folded into a U shape; and
after the wrapping step, overlapping the outer circumference side portion of each of the tensile cords over the inner circumference side portion thereof and vulcanizing the unvulcanized sheet rubber.

8. An elastic crawler comprising:
a crawler body comprising an elastic body in the form of an endless belt;
a plurality of metal cores embedded in the crawler body, each of the metal cores including vanes extending toward lateral ends of the crawler body and arranged at predetermined intervals in a circumferential direction of the crawler body; and
a plurality of tensile cords arranged in a transverse direction of the crawler body, wound around the outer circumference side of the vanes, and embedded in the crawler body while portions of both ends of each of the tensile cords are overlapped with one another in a predetermined length, wherein:
an inner circumference side end of each of the tensile cords is arranged at an outer circumference side of one of the vanes;
a distance between a portion from a vicinity portion of the inner circumference side end of each of the tensile cords to the inner circumference side end and an outer circumference side portion of the tensile cord overlapped with the portion from the vicinity portion to the inner circumference side end is increased from the vicinity portion toward the inner circumference side end or is larger than a distance between the rest of the overlapping portions of the tensile cord; and
a distance between the inner circumference side end of each of the tensile cords and the inner circumference side end of the one of the vanes is larger than a distance between the inner circumference side portion of the tensile cord and the other vanes at the rest of the overlapping portions of the tensile cord.

9. The elastic crawler according to claim 8, comprising a plurality of lugs arranged in the circumferential direction of the crawler body and protruding outwardly at predetermined intervals from an outer surface of the crawler body,
wherein the inner circumference side end of each of the tensile cords is arranged at the inner circumference side of one of the lugs.

10. The elastic crawler according to claim 8, comprising:
a plurality of lugs arranged in a circumferential direction of the crawler body and protruding outwardly at predetermined intervals from an outer surface of the crawler body;
at least one group of the plurality of tensile cords arranged at substantially uniform intervals in the transverse direction of the crawler body; and
the inner circumference side ends of the group of the tensile cords are arranged at the inner circumference side of one of the lugs.

11. A method of manufacturing for manufacturing the elastic crawler according to claim 8, comprising the steps of:
wrapping the inner circumference side end of each of the tensile cords along a crease of an unvulcanized sheet rubber folded into a U shape; and
after the wrapping step, overlapping the outer circumference side portion of each of the tensile cords over the inner circumference side portion thereof and vulcanizing the unvulcanized sheet rubber.

12. An elastic crawler comprising:

a crawler body comprising an elastic body in the form of an endless belt;

a plurality of metal cores embedded in the crawler body, each of the metal cores including vanes extending toward lateral ends of the crawler body and arranged at predetermined intervals in a circumferential direction of the crawler body; and a plurality of tensile cords arranged in a transverse direction of the crawler body, wound around an outer circumference side of the vanes, and embedded in the crawler body while portions of both ends of each of the tensile cords are overlapped with one another in a predetermined length, wherein:

an inner circumference side end of each of the tensile cords is arranged at an outer circumference side of one of the vanes; and by providing a bent portion on the outer circumference side portion overlapped with a portion from the vicinity portion of the inner circumference side end of the tensile cord to the inner circumference side end, the bent portion outwardly curved to secure a larger distance between the overlapping portions of the tensile cord than that between the rest of the overlapping portions, each of the tensile cords is formed so that a distance between a vicinity portion of the inner circumference side end of each of the tensile cords and an outer circumference side portion of the tensile cord overlapped with an inner circumference side portion of the tensile cord increases from the vicinity portion toward the inner circumference side end or is larger than a distance between the rest of the overlapping portions of the tensile cord.

13. The elastic crawler according to claim 12, comprising a plurality of lugs arranged in the circumferential direction of the crawler body and protruding outwardly at predetermined intervals from an outer surface of the crawler body, wherein the inner circumference side end of each of the tensile cords is arranged at the inner circumference side of one of the lugs.

14. The elastic crawler according to claim 12, comprising:

a plurality of lugs arranged in the circumferential direction of the crawler body and protruding outwardly at predetermined intervals from an outer surface of the crawler body;

at least one group of the plurality of tensile cords arranged at substantially uniform intervals in the transverse direction of the crawler body; and the inner circumference side ends of the group of the tensile cords arranged at the inner circumference side of one of the lugs.

15. The elastic crawler according to claim 12, comprising:

a plurality of lugs arranged in the circumferential direction of the crawler body and protruding outwardly at predetermined intervals from an outer surface of the crawler body;

at least one group of the plurality of tensile cords arranged at substantially uniform intervals in the transverse direction of the crawler body; and the inner circumference side ends of the group of the tensile cords arranged at the inner circumference side of one of the lugs, wherein:

each of the tensile cords includes:

a first step provided in the vicinity of the inner circumference side end of the tensile cord so that the inner circumference side end is arranged further on an inner circumference side than an opposite side; and a second step provided in vicinity of a starting point so that a portion of overlapping of the outer circumference side portion of the tensile cord ranging from the starting point of overlapping or from a portion in immediate vicinity of the starting point to an outer circumference side end of the tensile cord is arranged further on an outer circumference side than a portion beside the starting point.

* * * * *